United States Patent [19]
Dusinberre, II et al.

[11] Patent Number: 5,989,139
[45] Date of Patent: Nov. 23, 1999

[54] HYDRAULIC TENSIONER WITH EXTERNAL RACK

[75] Inventors: E. Paul Dusinberre, II, Interlaken; Sam A. Kuznets, Burdett; Roger T. Simpson, Ithaca, all of N.Y.

[73] Assignee: Borg-Warner Automotive, Inc., Troy, Mich.

[21] Appl. No.: 09/232,388

[22] Filed: Jan. 15, 1999

Related U.S. Application Data

[63] Continuation-in-part of application No. 08/852,925, May 8, 1997.

[51] Int. Cl.$^6$ ........................................................ F16H 7/08
[52] U.S. Cl. ............................ 474/110; 474/111; 474/135
[58] Field of Search ........................... 474/110, 111, 474/109, 101, 135, 138, 113–117

[56] References Cited

U.S. PATENT DOCUMENTS

| | | | |
|---|---|---|---|
| 2,210,276 | 8/1940 | Bremer | 474/110 |
| 3,081,643 | 3/1963 | Huboi et al. | 474/111 |
| 5,030,169 | 7/1991 | Kiso et al. | 474/110 |
| 5,649,878 | 7/1997 | Noguchi et al. | 474/135 X |

FOREIGN PATENT DOCUMENTS

| | | | |
|---|---|---|---|
| 3249504 | 5/1984 | Germany | 474/111 |
| 6-94089 | 4/1994 | Japan | 474/110 |

*Primary Examiner*—Tamara L. Graysay
*Assistant Examiner*—Marcus Charles
*Attorney, Agent, or Firm*—Sidley & Austin; Greg Dziegielewski

[57] ABSTRACT

A hydraulic tensioner having a rack and ratchet system that provides a no-return function, limits maximum piston travel outward from the housing, and retains the piston in place for shipping. The rack and ratchet system includes a ratchet clip with flexible tabs and a plurality of grooves on the outside of a piston.

8 Claims, 4 Drawing Sheets

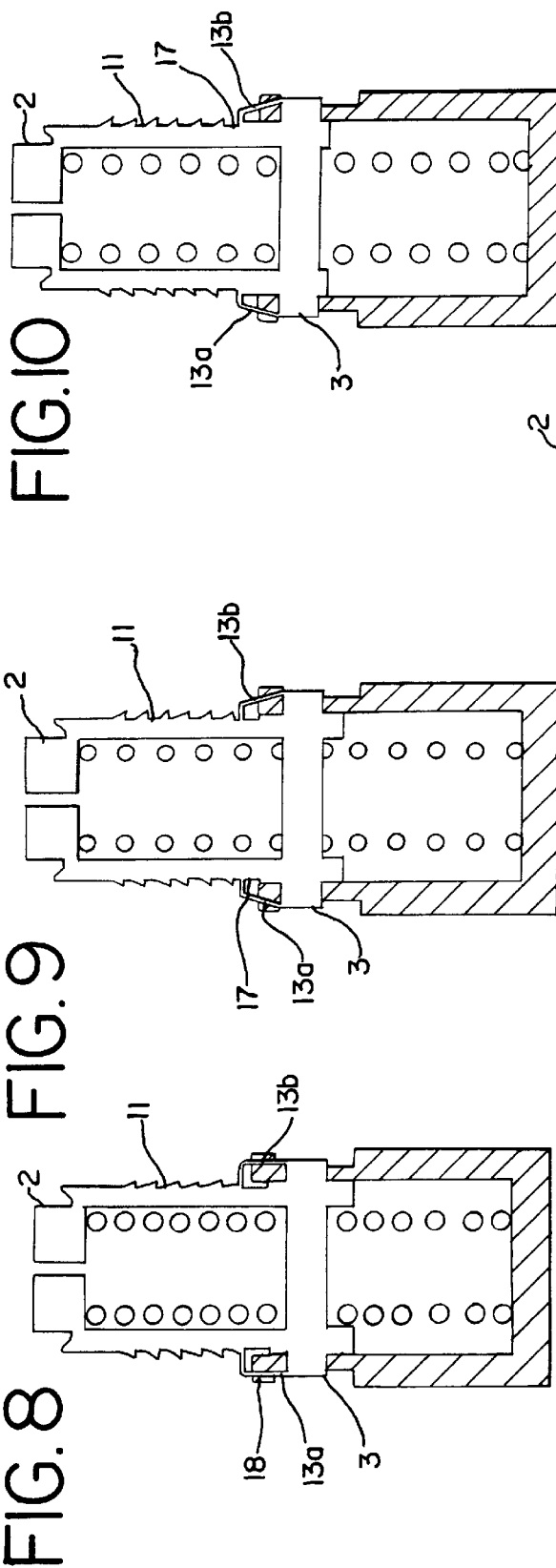

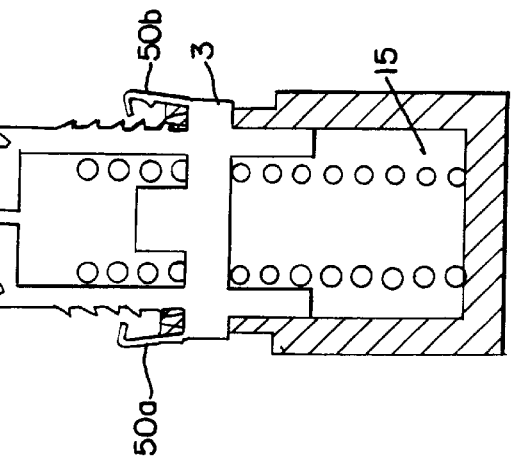
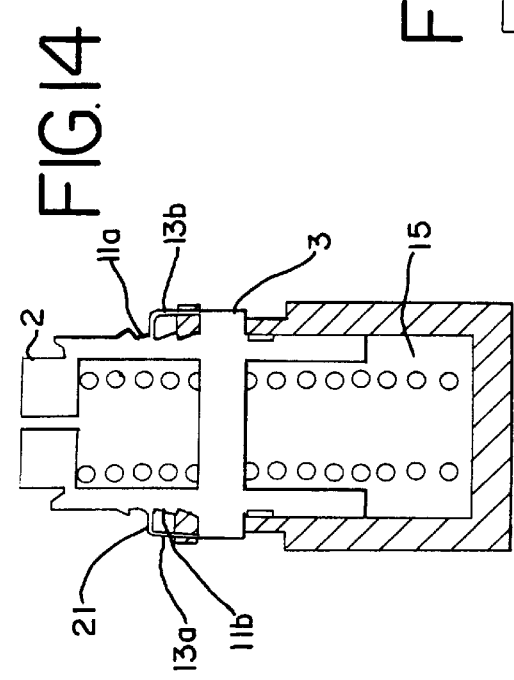
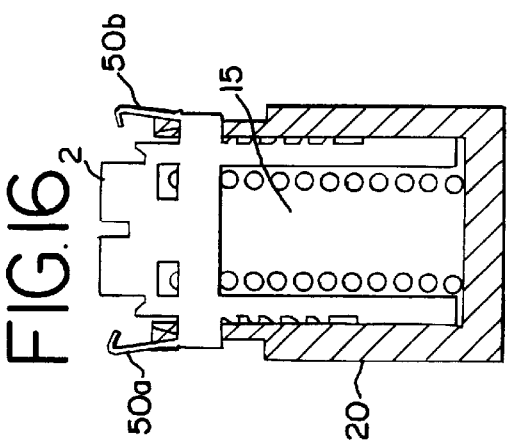
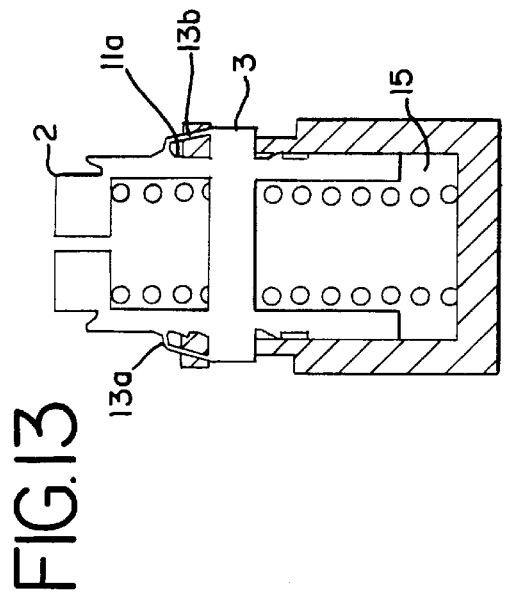
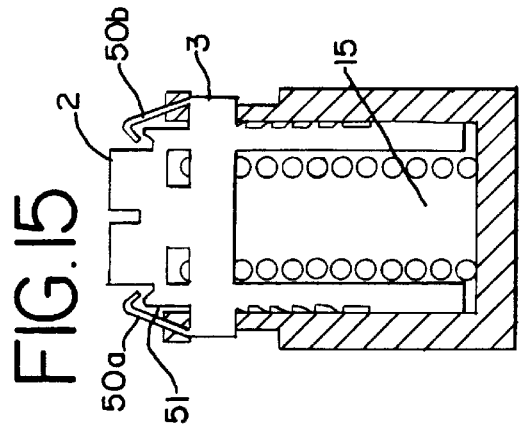

HYDRAULIC TENSIONER WITH EXTERNAL RACK

This application is a continuation-in-part of Ser. No. 08/852,925 filed May 8, 1997.

BACKGROUND OF THE INVENTION

The present invention relates to a hydraulic chain tensioner having an external rack. More particularly, the hydraulic tensioner of the present invention includes a ratchet clip that travels along a rack on the outside of the piston to limit piston travel, hold the piston in place for shipping, and limit backlash.

Hydraulic tensioners are typically used as a control device for a chain drive in an automobile engine timing system. The tension in the chain can vary greatly due to the wide variation in the temperature and the linear expansion among the various parts of the engine. Moreover, wear to the chain components during prolonged use can produce a decrease in the tension of the chain. A hydraulic tensioner is used to take up the slack in the chain or belt that connects the camshafts to the crankshaft of the engine timing system. The tensioner piston must be able to extend outward as the chain stretches from higher engine speed and withdraw back inward when the chain loads have decreased with lower engine speeds. The piston travel from idle to maximum engine speed for most overhead cam engines ranges from 1 to 4 mm.

A typical hydraulic tensioner is comprised of a housing having a bore, a piston biased in a protruding direction from the bore by a spring, and a fluid chamber defined by the hollow piston and bore. A check valve is also included in the hydraulic tensioner to permit fluid flow from a source of pressurized fluid into a reservoir or oil supply passage into the fluid chamber, while preventing back flow in the reverse direction. The force of the chain against the piston in an inward direction is by the resistance force of the fluid and the force of the spring in an outward direction.

A typical hydraulic tensioner usually has a no-return function, where the piston moves easily in one direction, but with more difficultly in the reverse direction. When the engine is started, the oil supply pressure to the tensioner is delayed by several seconds. During this time, the tensioner may not have enough oil to fill the fluid chamber. As a result, the piston could be pushed to the bottom of the tensioner bore from the chain motion. A proper load would not be maintained on the chain and noise could be generated. In addition, the lower piston position might even allow the chain to jump a tooth on either the crank or cam sprockets.

One example of a tensioner having a no-return function is shown in Winklhofer et al., U.S. Pat. No. 3,802,286. The piston of the Winklhofer et al. tensioner has a spiral rack on the inside wall of the bore to limit back travel and prevent the piston from retracting. Another example of a tensioner having a no-return function, Yoshida, U.S. Pat. No. 3,812,733, has a ratchet system with grooves on the outside of a piston and a detent with a spring to prevent the piston from advancing and retracting. Similarly, in U.S. Pat. No. 4,713,043, Biedermann includes grooves on the outside of the piston with a spring-loaded catch.

The rack or no-return system must also permit some backlash or limited backward piston movement. In U.S. Pat. No. 4,792,322, Goppelt addresses the problem of insufficient backlash by including an internal ring and groove system. An additional ring and groove are also used to hold the piston in place during shipping. This system is expensive because the grooves must be on the inside of the tensioner bore as well as on the outside of the piston.

Suzuki, U.S. Pat. No. 4,822,320 also provides an anti-backlash rack with grooves broached into the outside of the piston. A ratchet is pivotally connected to a housing to allow positive backlash. Suzuki also provides this ratchet system in U.S. Pat. No. 4,874,352, where the ratchet is supported by a spring, and in U.S. Pat. No. 5,006,095, where the number of teeth on the ratchet is n times that of the teeth on the rack. In addition, Shimaya, U.S. Pat. No. 5,073,150, incorporates the ratchet mechanism of Suzuki with a different tensioner.

Another example of a ratchet mechanism is disclosed in Deppe et al., U.S. Pat. No. 5,304,099. The ratchet mechanism of Deppe et al. includes grooves on the outside of a piston and a ratchet plunger biased by a spring. The ratchet is disengaged during normal operations and engaged during shut down to maintain the tensioner in an operative position.

An example of a mechanism that limits the travel of a shaft device is disclosed in Ojima, U.S. Pat. No. 5,004,448. A coil portion contacts a tension rod. The coil acts as a friction brake by causing an enlargement to prevent advancement of the rod or a shrinkage of the diameter of the coil portion to release the rod from the tensioner.

Mott, U.S. Pat. No. 5,259,820, provides an internal ratchet system positioned within the mounting cavity and constructed from a cylinder having two helical openings. The piston engages with the helical openings when the piston experiences sufficient force to be pushed inward. As a result, this tensioner provides tension to the chain when the fluid pressure to the tensioner is low.

Similarly, in the present invention, an anti-backlash rack is provided on the inner surface of the piston to provide tension during low pressure. The piston is still permitted to move back several millimeters more than the average piston when the engine is running. In addition, the ratchet system of the invention limits piston travel, holds the piston for shipping and provides an anti-backlash travel device in one mechanism.

SUMMARY OF THE INVENTION

The present invention is directed to a hydraulic chain tensioner having an external rack. The tensioner includes a housing with a central bore. A hollow piston is slidably received within the bore and creates a fluid chamber with the bore. The piston, or plunger, is biased in a protruding direction from the housing by a spring.

A passage is provided in the housing to connect the chamber with a source of pressurized fluid. A check valve is provided between the chamber and the source of pressurized fluid to permit fluid flow into the chamber, while blocking flow in the reverse direction. The check valve may be a ball and spring check valve, a spring valve, or a variable orifice check valve, as presently known in the tensioner art.

The tensioner also includes a rack and ratchet assembly that has several features. First, the assembly provides a mechanical no-return function, or anti-backlash feature. A rack comprising a series of wedge-shaped grooves is formed on the outside of the piston and a circular spring steel ratchet clip is snapped into place around the outside of the housing in a groove that permits limited travel of the clip in the axial direction. A plurality of flexible retention tabs press against the piston to prevent the piston from being pushed toward the bore. The tabs slide on the rack members and snap into place as the piston moves outward.

A piston retention feature of the rack and ratchet system limits the outward travel of the piston. After the flexible tabs pass the last rack member, or groove, on the piston, the tabs snap toward the piston and catch in the last raised portion of the piston. Alternatively, additional tabs on the ratchet clip, snap toward the piston and catch in the housing groove to prevent further upward movement of the piston. As a result, no further outward movement of the piston is permitted.

Another feature of the present invention is the shipping retention tabs, which are mounted to the same ratchet clip that the flexible tabs are mounted. The shipping retention tabs hold the piston in the innermost position for shipping and automatically release when the tensioner is installed in an engine or when the engine is first started.

BRIEF DESCRIPTION OF THE DRAWINGS

FIG. 8 is a sectional view of the rack and ratchet assembly of the hydraulic tensioner with the piston in an outward position and the flexible tabs in the rack.

FIG. 9 is a sectional view of the rack and ratchet assembly of the hydraulic tensioner with the piston in an outward position and the flexible tabs in the piston retention slot.

FIG. 10 is a sectional view of the rack and ratchet assembly of the hydraulic tensioner with the piston in a maximum outward position with the flexible tabs at the bottom of the piston retention slot.

FIG. 11 is a sectional view of the rack and ratchet assembly of the hydraulic tensioner with the piston retracted in a shipping position and the shipping retention tabs in a locked position.

FIG. 12 is a sectional view of the rack and ratchet assembly of the hydraulic tensioner with the piston in an inward position and the flexible tabs in the rack.

FIG. 13 is a sectional view of the rack and ratchet assembly of the hydraulic tensioner with the flexible tabs set in the first rack slot.

FIG. 14 is a sectional view of the rack and ratchet assembly of the hydraulic tensioner with the flexible tabs set in the second rack slot.

FIG. 15 is a sectional view of the rack and ratchet assembly of the hydraulic tensioner with the piston set in its lowest position with the retention tabs pressed inward.

FIG. 16 is a sectional view of the rack and ratchet assembly of the hydraulic tensioner with the piston at its lowest position with the retention tabs released and extending outward.

FIG. 17 is a sectional view of the rack and ratchet assembly of the hydraulic tensioner with the piston outward and the retention tabs in the released position.

DETAILED DESCRIPTION OF THE PREFERRED EMBODIMENTS

Figure 1:
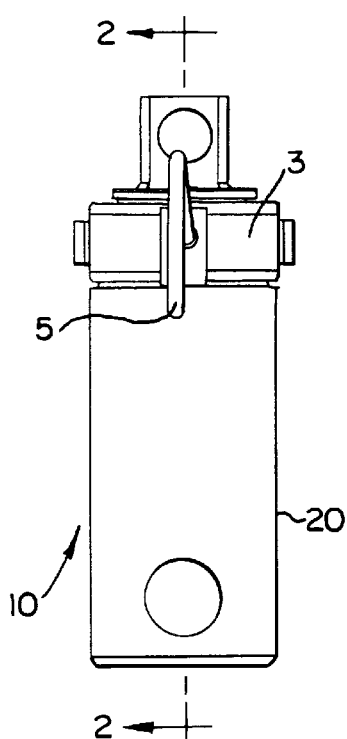
FIG. 1 is a front view of the hydraulic tensioner of the present invention.
Figure 2:
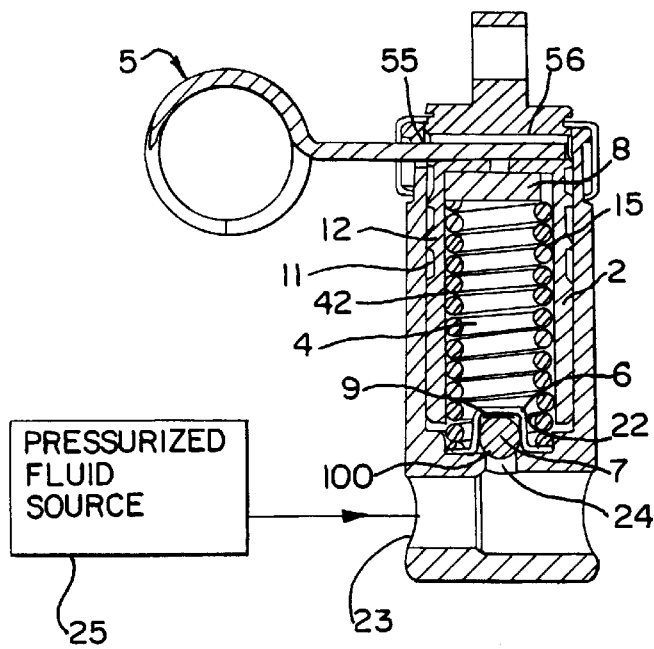
FIG. 2 is a sectional view of the tensioner of FIG. 1 taken along line 2—2.
Figure 5:
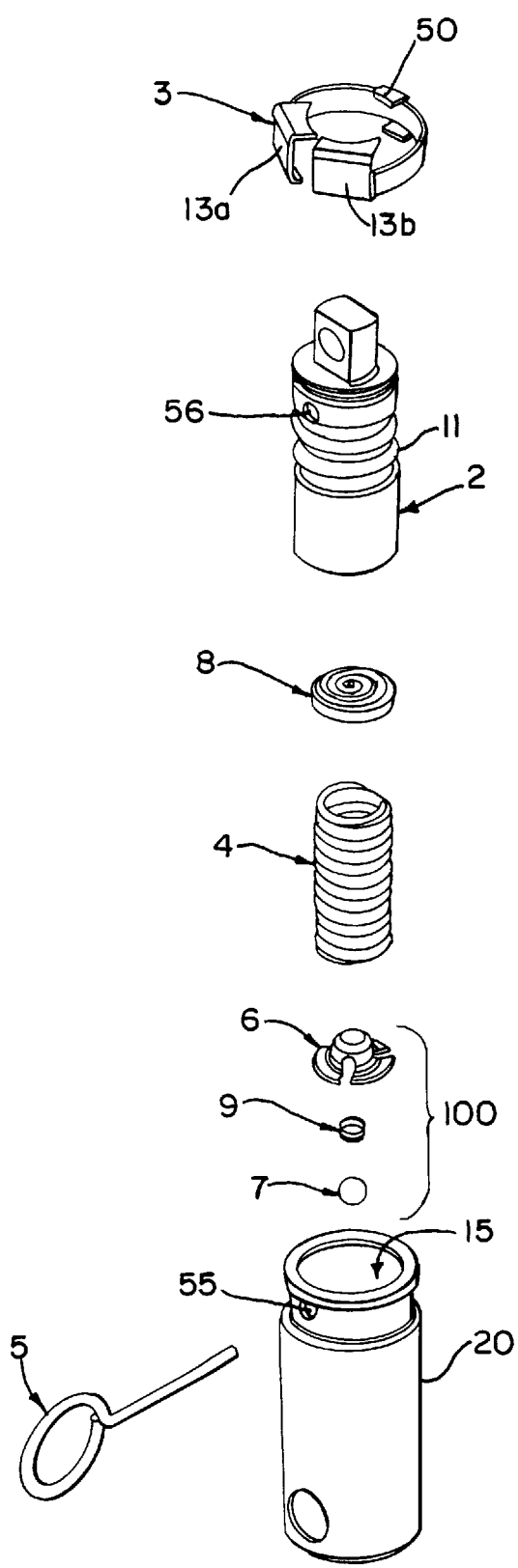
FIG. 5 is an exploded perspective view of the hydraulic tensioner of FIG. 1.

FIG. 1 illustrates the hydraulic tensioner 10 having a housing 20, a retaining pin 5, and a ratchet clip 3 snapped in place around the bore 15. As shown in FIGS. 2 and 5, within the tensioner housing 20, there is a bore 15, a chamber 22 filled with fluid through a passageway 24 from a pressurized fluid source 25. The fluid source may be an oil pump or a reservoir. The chamber, preferably cylindrical, receives a hollow piston 2, also preferably cylindrical, having an interior space 42. The outside of the piston 2 has several grooves, or steps, 11 to form rack 12 that contacts ratchet clip 3 as the piston moves outward from bore 15. The ratchet clip 3 includes flexible tabs 13a and 13b, which move within the grooves 14 of the rack, and retention tabs 50, which hold the piston in place for shipping. A vent disc 8 contacts the inside 48 of the upper end of the piston, and a spring 4 contacts the vent disc 8 to bias the piston 2 in a protruding or outward direction.

During start-up of the hydraulic chain tensioner, fluid enters through passageways 23 and 24 and fills up the chamber 22 while pushing air to the upper end of the chamber 22. As the chamber 22 fills with fluid, the piston 2 moves outward from the chamber 22 due to the force of the spring 4 and the pressure of the fluid supplied by the external source.

Figure 3:
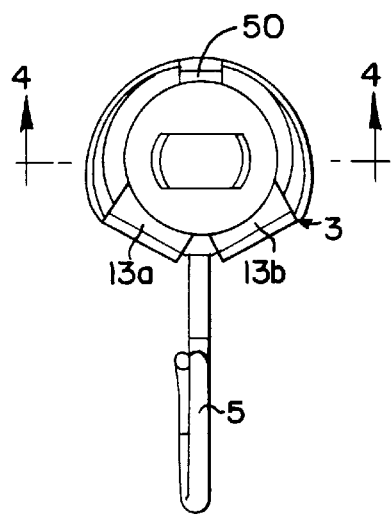
FIG. 3 is a top view of the tensioner of FIG. 1.
Figure 4:
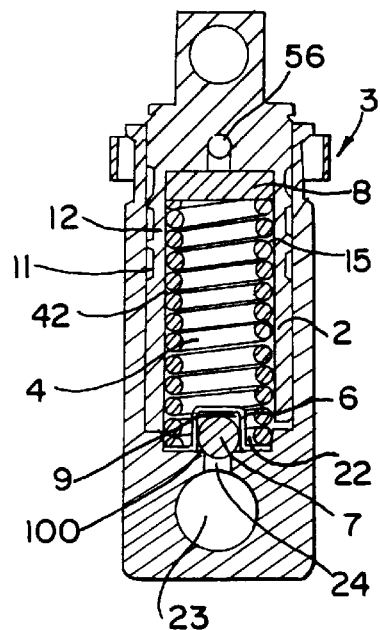
FIG. 4 is a sectional view of the hydraulic tensioner of FIG. 3 taken along line 4—4.

A check valve 100 is provided between the chamber 22 and the passageway 24 to the source of fluid pressure to permit fluid flow into the chamber 22, while blocking fluid flow in the reverse direction. The check valve 100 includes a ball 7, ball retainer 6, and spring 9. The check valve may be a variable orifice check valve as shown and described in U.S. Pat. No. 5,259,820 and U.S. Pat. No. 5,277,664, both of which are owned by the assignee of the present application and both of which are incorporated herein by reference. FIG. 3 shows the top of the tensioner 10, and FIG. 4 shows a sectional view of the tensioner 10 along line 4—4 of FIG. 3. FIG. 5 illustrates the separate parts of the tensioner 10.

Figure 6:
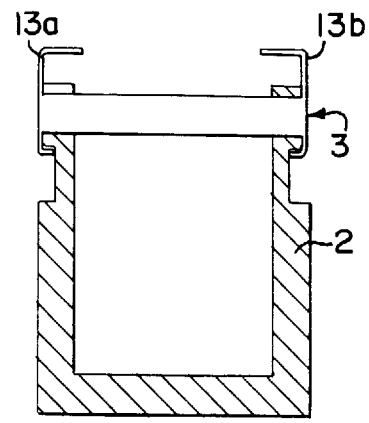
FIG. 6 is a sectional view of the tensioner showing a first embodiment of the ratchet clip.
Figure 7:
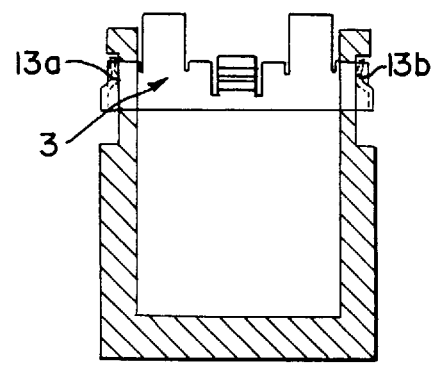
FIG. 7 is a sectional view of the tensioner showing a second embodiment of the ratchet clip partially in phantom view.

The rack and ratchet system of the present invention has three main features, which include a maximum outward piston retention feature, a shipping retention feature for holding the piston during shipping with an automatic release, and a no-return or limited backlash feature. As shown in FIG. 6, one feature of the rack and ratchet system, the no-return function or limited backlash device, is achieved through flexible tabs 13a and 13b on ratchet clip 3, which contact the rack or grooves formed on the piston. The tabs 13a and 13b may have a squared shape with extensions above the ratchet clip 3 that are bent and pressed against the piston 2. Alternatively, as shown in FIG. 7, the anti-backlash members, or flexible tabs, 13a and 13b may be curved and located on the outside of the ratchet clip 3, but extend radially inward at the same location as the ratchet clip 3.

FIG. 8 illustrates the tabs 13a and 13b pressed against the piston 2 and contacting corresponding rack members to prevent the piston 2 from being pushed inward. The flexible tabs 13a and 13b are designed to have a shear loading between the groove 11 and the lip 18 of the bore. Upward movement of the piston causes the tabs 13a and 13b to slide along the ramp of each rack member until they snap into the next rack member. After the tabs 13a and 13b pass the last wedge-shaped groove 17, or rack member, as shown in FIG. 9, the members 13a and 13b snap toward the minor diameter of the piston 2, shown in FIG. 10. The last groove 17 is shaped as a step, rather than a wedge, so that the tabs 13a and 13b will catch in the last raised portion of the piston 2 and stop the piston 2 from leaving the tensioner. This provides an upper limit on piston travel, or the maximum outward piston retention feature, which keeps the piston 2 in the bore 15.

As a result of the rack and ratchet system, when the oil pressure decreases and the chain tension forces the piston inward, the piston 2 remains in its last most outward position due to the tabs 13a and 13b pressing against the bottom of the rack members. The piston 2 will not move inward due to the cooperation of the tabs 13a and 13b and the groove 17. Even when the fluid pressure is low or does not exist, the no-return function is retained by operation of the rack and ratchet assembly.

When the tensioner is shipped, the piston 2 is moved to its innermost, or shipping, position. During operation of the tensioner, the piston 2 moves outward until the tabs 13a and 13b spring inward and under the first rack member, as shown in FIG. 12. The tabs 13a and 13b hold the piston 2 from retraction when no fluid is present by contacting the underneath part of each rack member, or groove 11a. In FIG. 13, the piston 2 is held in a first rack position as tabs 13a and 13b contact the first groove 11a. As the piston 2 moves outward from the bore 15, the tabs 13a and 13b will slide along the length of the first groove 11a, or rack member, as shown in FIG. 14, until the next groove, or rack member, is reached. During this operation, the piston 2 must have some limited travel inward and outward from the bore 15 as the engine speed increases from idle to maximum speed and back. The distance the piston 2 may travel is a combination of the pitch of the grooves 11 and the length of the ratchet ring 3 on the bore minus the thickness of the tab 13a.

The shipping retention feature, as shown in FIG. 15, provides piston shipping retention and an automatic release. The shipping retention members 50a and 50b are attached to the ratchet clip 3 and may be mounted at 90 degree increments from the flexible tabs 13a and 13b. The retention members 50a and 50b hold the piston 2 in an innermost retention position during shipping. This feature is set by pushing the piston 2 to the bottom of the bore 15. The flexible retention members 50a and 50b are then pushed in toward the center of the piston 2. As the piston 2 is slowly released, the retention members 50a and 50b clip over the lip 51 of the piston to prevent the piston 2 from extending further. In this position, clip 5 is inserted in hole 55 to hold the piston securely in place as the clip extends through hole 56 in the piston.

When the tensioner is installed in an engine and the engine is started, the retention members 50a and 50b will automatically release the piston 2 upon an inward force on the piston, as shown in FIG. 16. The release occurs as the piston 2 is pushed in toward the bore 15 and the flexible tabs 50a and 50b spring outward. The piston 2 may be pushed toward the bore 15 in two ways. First, with a cartridge style tensioner that is screwed into the engine block or head, the piston 2 contacts a chain guide (not shown). When the chain is tight, the piston 2 rests against the guide. The tensioner bore 15 moves relative to the piston and the retention members 50a and 50b release the piston 2.

Second, with other types of tensioners, when the engine has started, the oscillatory motion and force of the chain and guide push the piston 2 in toward the bore 15. Once the piston 2 has been pushed inward, the retention members 50a and 50b will spring away from the piston and release the piston 2. In both methods, as the piston 2 moves inward relative to the bore, the retention members 50a and 50b spring away from the piston 2. As a result, the piston 2 is released from the shipping position and is able to move away from the bore 15, as shown in FIG. 17. The retention members 50a and 50b may remain on the ratchet clip 3 and are never used again, or they may be removed when the tensioner is installed in the engine.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic chain tensioner comprising:

a housing having a bore;

a hollow piston slidably received within the bore, said piston forming a fluid chamber with said bore and having a plurality of grooves formed along the outside of the piston;

a circular spring steel ratchet clip member positioned radially outward from and concentric with said piston in a groove in said housing, said ratchet clip member having a plurality of flexible tabs constructed and arranged to contact said grooves along the outside of said piston and limit the piston travel in the axial direction, said tabs being normally biased radially inwardly to contact said piston grooves;

a spring biasing the piston in an outward direction from said bore;

a check valve provided between the chamber and a source of pressurized fluid to permit fluid flow into the chamber while blocking flow in the reverse direction; and said flexible tabs cooperating with said piston grooves to provide a position of maximum outward axial travel for said piston.

2. The hydraulic chain tensioner of claim 1 wherein said ratchet clip is a circular spring steel clip concentrically spaced from said housing.

3. The hydraulic chain tensioner of claim 1 where said piston includes at least one stepped groove for contacting said flexible tabs to provide a position of maximum outward axial travel of said piston.

4. The hydraulic chain tensioner of claim 1 wherein said piston grooves comprise a plurality of wedges.

5. The hydraulic chain tensioner of claim 1 wherein outward axial movement of said ratchet clip is limited by said housing groove.

6. The hydraulic chain tensioner of claim 1 wherein said ratchet clip includes a plurality of flexible retention tabs for holding said piston at an innermost axial position.

7. The hydraulic chain tensioner of claim 6 wherein said retention tabs are normally biased in a direction radially outward from said piston.

8. The hydraulic chain tensioner of claim 7 wherein said retention tabs cooperate with a retention groove at the uppermost portion of said piston to retain said piston in said innermost position.

* * * * *